United States Patent Office 3,493,780
Patented Feb. 3, 1970

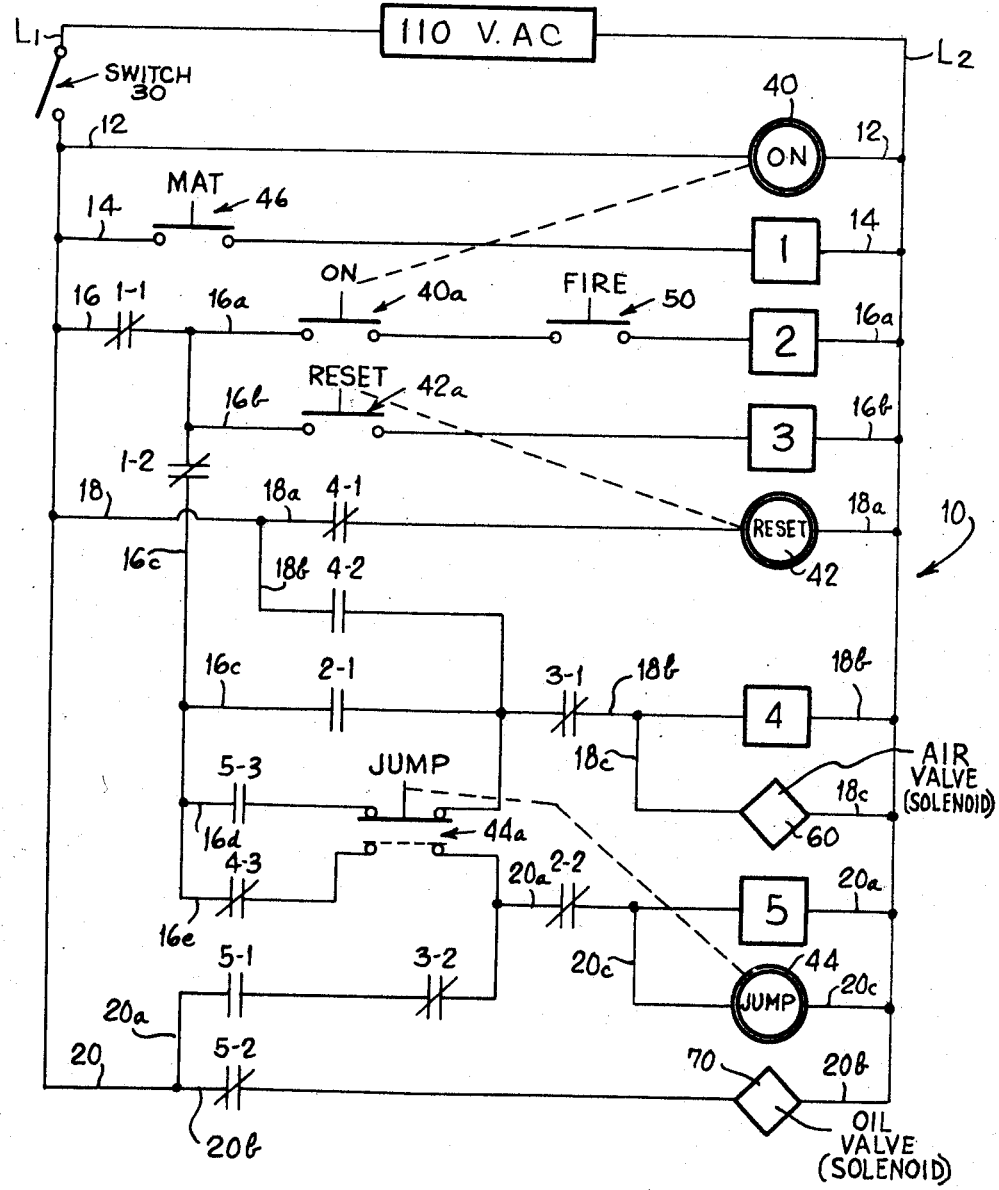

3,493,780
SAFETY DEVICE
Kenneth G. Wiggs, Atwood, Karl H. Emich, Decatur, and Richard E. Wiley, Tuscola, Ill., assignors to National Distillers and Chemical Corporation, New York, N.Y., a corporation of Virginia
Filed Nov. 22, 1967, Ser. No. 685,126
Int. Cl. H01h 31/10, 33/52
U.S. Cl. 307—116                                  13 Claims

ABSTRACT OF THE DISCLOSURE

A control means is provided for a tensile tester, or like machine, which machine includes an oil valve and an air valve. Complete control of the oil valve and the air valve in a desired set of operations is provided, and further, a mat operated safety switch insures safety to a person standing near the machine by "locking" the machine in whatever position it happens to be in when the safety switch is actuated.

---

This invention relates to a safety device, and more particularly, to an improvement in the control of machines that present danger to bystanders.

The safety device of the present invention is in the form of a control means including a safety switch which is arranged to provide control over a high speed machine. Although the safety switch is adapted particularly for use with a control panel or board that specifically functions to control the operations of a tensile tester, it will be understood that the general principle of the invention is readily applicable to the control of a variety of machine operations where danger is present to an operator or other person standing near the machine.

The safety switch per se will be described in the specific form of a mat switch, that is, a switch controlled by a mat such that when the mat is stepped upon by an operator, or innocent bystander the switch will be actuated and thereby set into motion an activity that will prevent bodily harm to the person. Of course, mat switches have been known in the prior art for many years as shown, for example, in U.S. Patent 3,147,000 and the present invention is not limited to any precise form or detail of mat switches.

Beyond showing a form of mat switch, the above-noted patent also shows a scheme for interfering with the circuit operation which would normally cause the actuation of a mechanical device. The interference is produced by the use of a so-called safety mat switch which is judiciously connected into the actuating circuit. However, since the ultimate device or element to be actuated, i.e. door-opening equipment, is of a rudimentary kind, the only functions required for the safety mat switch are those simply relating to this one piece of equipment. That is to say, it is simply required to control the actuation of the door-opening means under certain predetermined conditions. For example, the normal actuation of the door-opening means by a mat located at one side of the door is inhibited if someone is standing on the safety mat located on the other side of the door.

In contrast with the system of the patent referred to above, it is the basic objective of the system of the present invention to so control the operation of a functioning plurality of devices, forming part of a tensile tester or the like, that complete protection will be furnished by the control means regardless of the point during the involved sequence of control operations for the plurality of devices at which the control means is actuated. In brief, then, and to be specific, whenever the mat is stepped on, the bystander will be safe despite the complicated sequence of events entailed by the operation of the control means.

Accordingly, it is a fundamental object of the present invention to control the sequential operation of a plurality of devices in a complicated machine to prevent harm to persons standing near the machine.

Another object is effectively to disable the control panel which serves to control, through a system of interlocking relays, the aforesaid plurality of devices.

Another object is to provide a switch that may be operated at any time by the presence of an innocent bystander to prevent injury to him by halting the operation of the devices.

Stated briefly, then, a basic feature of the present invention is that the machine which may cause harm is "frozen" or "locked" into whatever position it happens to be in when the control element is actuated. In a specific form, this means that the apparatus is "locked in" whenever a mat is stepped on thereby preventing injury to the operator or to bystanders, or even to the aparatus itself.

Considering the particular field of applicability heretofore noted, that is, to control a plurality of functioning devices in a high speed tensile tester, it should be pointed out that such a tensile tester includes, as part of its operating components, an air valve and an oil valve, for purposes well-known to those skilled in the art.

In general, however, it may be stated that the operation is such that air is used to force down a crosshead, but oil is also used, suitably controlled, to oppose that motion produced by the air. This arrangement is for the purpose of attaining uniform crosshead motion. Were it otherwise, that is, if there were no restriction by means of the oil, then the crosshead would move too fast. Thus, the several components must be controlled in a prescribed sequence in order to perform properly the testing of a desired sample.

The foregoing and other objects, features and advantages of the invention will be apparent from the following more particular description of preferred embodiments of the invention as illustrated in the accompanying drawing.

The drawing is a schematic representation of the control panel provided for a tensile tester and illustrates schematically the solenoids for the air valve and oil valve of the tensile tester, the functions of which are to be controlled.

Referring now to the drawing, there is illustrated a preferred embodiment of the present invention in which a set of components are shown symbolically. The several circles shown in the drawing represent a number of push button switches. However, they symbolize not only the push buttons to be actuated but in addition, associated relay coils if any, and indicating lights, as will be understood by those skilled in the art.

The squares labelled 1, 2, 3, 4 and 5 represent a number of control relays situated on a control panel, the function of which will be explained later. The diamond-shaped symbols represent solenoids which control the aforementioned air valve and oil valve which are constituent devices of the tensile tester.

It should be particularly noted here that the most prominent danger to an operator or bystander is presented by the unguarded pinch-points on the tensile tester. These then, pose the major safety problem. Therefore, a mat (not shown) controlling a mat switch is located with respect to the tensile tester so that as a person approaches the dangerous pinch-points, he will position himself such that he will be standing on the mat. Of course, it is quite evident that, although reference is here made to a mat, other suitable means can be adapted to be placed in the region of these dangerous pinch-points so as to be actuated by the presence of a person standing near the machine.

It will be seen in the drawing that two main lines, L1 and L2, are brought to control means 10 from a typical source of AC, such as 110 volt AC. A plurality of branch circuits 12, 14, 16, 18 and 20 are connected across lines L1 and L2. In other words, there are a plurality of branch circuits formed from the main circuit. Branch circuit 16 is further subdivided into sub-branches 16a, 16b, 16c, 16d, and 16e. Likewise, branch circuits 18 and 20 are further sub-divided into sub-branches 18a and 18b and into sub-branches 20a and 20b respectively. Where a number of sub-branches come together before reaching line L2, the common branch is designated by the higher number. Thus, it will be seen that the common branch resulting fom sub-branch 18b coming together with sub-branches 16c and 16d is labelled 18b. Where further branching takes place a higher letter is assigned. Thus, the succeeding sub-branch from common sub-branch 18b is labelled 18c.

Main lines L1 and L2 are connected to control means 10 by a principal or key switch 30. A plurality of push button switches, shown symbolically by circles, are connected in several branch circuits. Thus, ON push button switch 40 is shown connected in branch 12. It will be understood by one skilled in the art that, as noted before, the circular symbol identifying button switch 40 is representative not only of the button to be actuated but also of an associated relay coil, if used, and an indicating light, which are well-known items per se. Therefore, by pushing button 40 ON switch contacts 40a located in branch 16a are actuated. This actuation takes place either through a direct mechanical linkage between button 40 and contacts 40a or by energization of an associated relay coil; this relationship being conveyed by the dotted lines in the drawing. Likewise, reset push button switch 42 in sub-branch 18a is similarly effective, again as shown by dotted lines, to actuate switch contacts 42a, which are located in sub-branch 16b.

The additional push button type of switch, namely, switch 44, designated Jump, is of similar construction. However, it is effective by virtue of the particular arrangement of contacts 44a; to perform a double switching operation. Thus, when push button switch 44 is pressed, there is momentarily produced a closure of the lower set of contacts 44a, but the switch action is such that, this lower set will be closed only for the moment and then, upon release of switch button 44, reclosure of the upper set of contacts 44a will be effected. The purpose behind this will be explained hereafter.

Referring now to the upper part of the drawing, it will be seen that branch circuit 14 contains mat switch 46 which is a single-throw switch physically positioned in a suitable manner within a mat which is located near the machine over whose actions the control panel is designed to establish control. Also connected in branch 14 is a control relay represented by a square which is labelled 1.

In branch circuit 16 near its connection to line 1, there is shown, first, a set of relay contacts 1—1. These relay contacts have been designated in a conventional manner, which is simply to say that the designation serves to indicate that contacts are the first contact to relay 1. Further, these contacts are symbolized by two parallel lines with a further line intersecting both of them. This means that relay contacts 1—1 are in a normally closed condition which is to say that they are closed when the relay coil is not energized. On the other hand, the relay contacts symbolized by only two parallel lines, are so shown to indicate, by a well-known convention, that such relay contacts are normally open contacts. Correspondingly, all of the other relay contacts shown in the drawing are designated by this convention.

In the sub-branches divided from branch 16, a number of different switches and relay contacts are arranged. In sub-branch 16a, contacts 40a are in series with the contacts of switch 50, designated Fire. This latter switch is a simple, single-throw, manually operated switch the purpose of which will be explained later. Control relay 2 is also connected in sub-branch 16a, while relay 3 is connected in sub-branch 16b, as well as switch contacts 42a which have been previously mentioned and which are controlled by Reset switch 42.

At the upper end of sub-branch 16c as it divides off from branch 16, the normally closed contacts 1–2 are connected, and, continuing in this sub-branch, it will be seen that normally open contacts 2–1 are also included. In sub-branch 18a, which is sub-divided from branch 18 connected to line L1, it will be seen that, in addition to Reset switch 42, there is a pair of normally closed contacts 4–1, while in sub-branch 18b, there is a pair of normally open contacts 4–2. In the common portion of sub-branch 18b, that is, in the branch formed following the connection of sub-branch 16c thereto, there is a pair of normally closed contacts 3–1, and sub-sequently a control relay designated 4. Additionally, in sub-branch 18c, one end of which is shown connected to L2, is in air valve solenoid 60.

Branch 20 at the lower portion of the figure divides into two sub-branches with sub-branch 20b having normally closed relay contacts 5–2 and an oil valve solenoid 70 connected therein. In sub-branch 20a extending from line L1 all the way to line L2, there will be seen in series; a set of normally open control relay contacts 5–1, normally closed contacts 3–2, normally closed contacts 2—2, and finally, control relay 5. Connected in parallel with control relay 5 is Jump switch 44 in sub-branch 20c.

Before proceeding with the description of the detailed operation of the control means of the present invention, it is well to point out first that an auxiliary safety feature is provided by the present invention. This plays an important role in overcoming a major hazard which might be presented in the event of a power failure. A fail-safe arrangement is provided by replacing the normally open oil valve that is conventionally used on a machine of the type under consideration with a normally closed valve. Thus, it will be seen in the drawing that oil valve solenoid 70 is arranged so that the valve controlled by it is in a normally closed position with the power off, thereby shutting off the oil supply. Only when power is on is it possible to have the oil valve opened by reason of the normally closed condition of control relay contacts 5–2.

The operation to be described will be better appreciated if it is borne in mind that the machine, i.e. the tensile tester, is one that would normally be provided only with simple toggle switches. Such an inadequate scheme means that careless operation with these switches can result in harm to the user. In other words, it is crucially important with a machine of this type to have a proper set of operations for the several constituent devices, including the aforenoted auxiliary fail-safe feature for the oil valve, and further including the mat operated safety switch, in the overall scheme of things.

Referring again to the drawing, the complete operation of control means 10 will be set forth, that is to say, there will be described just what happens when the interlock controls in the form of push buttons 40, 42, 44 are pushed in certain sequences, and the effect that the safety mat switch has on these operations.

GENERAL DESCRIPTION OF OPERATIONS
(OPERATION A)

Let it be assumed that none of the push buttons 40, 42, and 44 have been actuated, and, therefore, that none of the respective switch contacts 50a, 42a, and 44a have been closed; and further, let it be assumed that mat switch 46 is open. The machine is therefore in the so-called Reset position which may also be termed the initial position. In this position, the crosshead which forms part of the tensile tester is in the up position. This crosshead is piston-actuated so as to be moved from one position to another; that is to say, between an up and a down position.

Now, with switch 30 closed, electrical power in the form of 110 volt A.C. is supplied through lines L1 and L2, to the several branches, and in particular, to branch 16, whence it is applied to control relay contacts 1—1. From here, it may be further supplied to control relay 2 in sub-branch 16a, provided two conditions are fulfilled; namely, that the ON switch contacts 40a have been closed and that Fire switch 50 has been closed. Likewise, power is supplied to control relay 3 through sub-branch 16b in the event that Reset switch 42 is actuated so as to close contacts 42a.

Continuing with the other sub-branches, it will be noted that with control relay contacts 1-2 in the closed position, power may be passed through relay contacts 4-3 in sub-branch 16e, and thence, upon the actuation of Jump switch 44, by way of its lower contacts 44a, through contacts 2—2 (normally closed) to energize relay 5. However, assuming that Jump switch 44 has not been actuated, then relay 5 is not receiving power. Nevertheless, power is being supplied to branch 20b through a set of normally closed relay contacts 5-2 thereby energizing oil valve solenoid 70 and hence opening the oil valve. Normally, the oil valve is closed which is to say, it is closed when the oil valve soleonoid is not energized. Now let it be assumed that Fire switch 50 and ON switch 40 are actuated, mat switch 46 remaining open. Since switch contacts 40a of ON switch 40 and the contacts of Fire switch 50 are in series, both of them have to be closed in order to produce the desired effect. These switches are so situated that both hands of the operator must be used to actuate them, an additional safety feature.

With the contacts of push button ON switch 40 closed and the contacts of Fire switch 50 closed, relay 2 is energized. Energization of relay 2 closes normally open contacts 2-1, thereby supplying power through normally closed contacts 3-1 so as to energize relay 4. Air valve solenoid 60 is also energized by virtue of the closing of relay contacts 2-1, actuating the air valve, which thereupon causes the crosshead of the tensile tester to be driven down. Another effect of the energization of relay 2 is that relay contacts 2-2 are opened. However, this has no effect in the operation unless the Jump switch had been previously actuated; that is, it was actuated prior to actuating push button ON switch 40 and Fire switch 50.

Energization or relay 4 also causes opening of contacts 4-1 (normally closed), thereby turning off the Reset light associated with Reset switch 42. In addition, the energization of relay 4 causes the closing of contacts 4-2 (normally open), thereby locking in relay 4 and consequently locking in air valve solenoid 60. This is so because there is now a complete path from line L1 through branch 18, through sub-branches 18b and 18c and thence to line L2.

If, with the crosshead down, and with power supplied to relay 4 and air valve solenoid 60, Reset switch contacts 42a are closed by actuation of Reset push button switch 42, the following sequence occurs: Closure of Reset switch contacts 42a causes energization of control relay 3, thereby opening relay contacts 3-1 in common sub-branch 18b. This causes de-energization of air valve solenoid 60, consequently causing reversal of the controlled air valve. De-energization of relay 4 also causes the opening of contacts 4-2 which had previously been closed, but which contacts are normally open when relay 4 is de-energized. Also, by the de-energization of relay 4, normally closed contacts 4-1 are again closed thereby allowing the Reset light associated with Reset push button 42 to be turned on.

As a consequence of the aforesaid reversal of the air valve by the de-energization of air valve solenoid 60, air is removed from the top of the piston and is supplied through the oil system to the bottom of the piston, thus returning the crosshead to the Reset position.

DESCRIPTION OF OPERATION ACCORDING TO INVENTION (OPERATION B)

While the operation described above under the heading Operation A is a general one and could normally be followed, as an additional feature control means 10 of the present invention includes Jump switch 44. The reason for so including this Jump switch 44 is that the ultimate in uniform motion for the crosshead is not attained otherwise. Thus, in Operation A above, upon simultaneous actuation of ON switch 40 and Fire switch 50 the crosshead will initially descend at an uncontrolled rate more rapid than desired due to compression of the oil. Use of the Jump switch serves as will be seen to pre-compress the oil before initiation of the actual downward crosshead stroke. Hence, during this entire stroke the crosshead travel will be at a uniform rate, set by the oil system adjustment.

In an alternative operation to Operation A, described above Jump switch 44 is first pressed and released before anything else is done. As a result the following sequence takes place: When Jump switch 44 is pushed in, conduction can take place between the lower set of contacts 44a and, as a result, power can flow by way of normally closed contacts 4-3 and 2—2 so as to energize relay 5 and, also, to turn on the Jump light associated with Jump switch 44. Normally closed contacts 5-2 (in sub-branch 20b) are now open, and this results in closing the oil valve, remembering that oil valve solenoid 70 causes closure of the oil valve when power is removed from the solenoid. Concurrently, relay contacts 5-1 close and cause the locking in of relay 5. Thus, when the momentary contact between the lower set of contacts 44a of Jump switch 44 is interrupted by release of the switch, power is still being supplied to relay 5. Concurrently with the closure of relay contacts 5-1, contacts 5-3 (in sub-branch 16d) also close and remain closed by reason of the locking in of relay 5. Therefore, when contacts 44a of Jump switch 44 return to their upper or biased position, power is supplied to air valve solenoid 60 and also to relay 4. Energization of relay 4, of course, turns off the Reset light because of the opening of contacts 4-1. Also, the closure of contacts 4-2 again causes locking in of relay 4. Energization of relay 4 actuated the air thereby causing the crosshead to be driven down, but only to a degree sufficient to precompress the oil system since oil valve 70 is closed.

When ON switch 40 and Fire switch 50 are pushed, relay 2 is energized and, by the opening of relay contacts 2—2, relay 5 becomes de-energized and the oil valve then opens because of power being applied to oil valve solenoid 70 by way of now-closed contacts 5-2. Thus, the actual downward crosshead stroke occurs and the machine is in the fired position.

Under the original set of conditions, that is, after the actuation and release of Jump switch 44, if Reset switch 42 is then actuated rather than ON switch 40 and Fire switch 50 together relay 3 will become energized. This energization of relay 3 causes opening of contacts 3-1, thereby de-energizing relay 4 and, as a consequence, reversing the air valve, thereby changing the effective pressure from the top to the bottom of the piston. At the same time, relay 5 which had been in the locked position, as described, is de-energized because of the opening of contacts 3-2 responsive to the aforesaid energization of relay 3. De-energization of relay 5 closes contacts 5-2 (normally closed) thereby energizing oil valve solenoid 70 which in turn results in opening of the oil valve, remembering that oil valve solenoid 70 is set up to provide for opening of the oil valve when power is applied to the solenoid, and to cause closure of the oil valve when power is removed therefrom. Thus, the machine is returned to the Reset position if there is successive operation of Jump switch 44 and then Reset switch 42.

If the mat is stepped on during any of the previously described operations, mat switch 46 is closed thereby and relay 1 becomes energized, opening its contacts 1—1 and 1-2. This insures absolute safety to the operator or to any bystander who may come near the machine regardless of what state the machine may be in. The stepping on the mat thus "locks" the machine in position.

It should be particularly noted that oil valve solenoid 70 is not affected in its usual operation in the event that the mat is stepped on. In other words, as can be seen in the drawing, oil valve solenoid 70 is always receiving power as long as contacts 5-2 are closed and these contacts are not affected by mat switch 46. But such an operation whereby the oil valve is in the opened condition does not in and of itself pose any danger.

It should also be noted that contacts 1-2 which upon superficial examination might seem to be unnecessary, are actually necessary to prevent a so-called back circuit which could be provided from line L2, by way of sub-branch 18b through contacts 4-2 and "back" through contacts 2-1 and thence to relay 3.

Taking a typical point in the sequence of operations previously described in Operation B, it will be appreciated that if the Jump switch has just been activated so that relay 5 is locked in and the oil valve is closed as a result, then the stepping on mat switch 46 with the consequent energization of relay 1 means that power is no longer available to relay 2, so that even if ON switch 40 and Fire switch 50 are pressed, nothing will happen. Therefore, the crosshead will remain in position. Similarly, considering that Jump switch 44 has already been actuated and that ON switch 40 and Fire switch 50 also have already been actuated, then, as previously described, the crosshead would be in the down or fired position. Now, if mat switch 46 is actuated it will be apparent that, once again, the crosshead will remain just where it is because Reset switch 42 is ineffective. Pushing Reset switch 42 will not apply power to relay 3 to perform its usual functions. That is, relay 3 will not open contacts 3—1 and thereby reverse the air valve.

The above-described arrangement which provides that the crosshead remain in the down position is an important concomitant feature of the present invention. It might be though to be just as effective a scheme simply to provide that the mat switch act to interrupt the power supply to the machine. However, such an arrangement would automatically remove all power and produce a resetting of the crosshead every time the mat switch was actuated with the crosshead in the fired or down position which would be very undesirable.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention.

What is claimed is:

1. Control apparatus for providing control over a plurality of mechanical devices forming part of a machine, and for insuring safety to a person located near said machine comprising, control means including a plurality of switches connected in separate branch circuits; said control means further including a plurality of control relays controlled by said switches and operable to control the operations of said mechanical devices, and a plurality of energizable solenoids for directly affecting the operating states of said mechanical devices;

one of said switches being effective upon actuation thereof to control a first solenoid thereby to affect the state of a first mechanical device, said one switch further functioning thereafter to control a second solenoid thereby to affect the state of a second mechanical device;

a safety switch located adjacent to said machine and adapted to be actuated by a person standing nearby, said switch being operable to inhibit the effects of pre-determined ones of said control relays, thereby to leave said machine in the condition to which it had previously been set.

2. Control apparatus as defined in claim 1, wherein the actuation of said one of said plurality of switches is effective to de-energize said first mechanical device in its closed state and also temporarily to lock in the associated control relay so as to retain said first mechanical device in said state.

3. Control apparatus as defined in claim 2, wherein said one switch further functions thereafter to energize said second solenoid, thereby to place said second mechanical device in its closed state, and also temporarily to lock in the associated control relay so as to retain said second mechanical device in said state 4. Control apparatus as defined in claim 1, wherein said first mechanical device is an oil valve and said second mechanical device is an air valve.

5. Control apparatus as defined in claim 1, wherein said first and second solenoids, having been initially affected by the actuation of said one switch, are not thereafter affected by the inhibition of the effects of said pre-determined control relays produced by the actuation of said safety switch.

6. Control apparatus as defined in claim 4 wherein said control means includes a Fire switch and said machine includes a crosshead, and wherein said plurality of switches includes a first switch which when actuated together with said Fire switch acts upon said air valve and said oil valve to cause a downward stroke of said crosshead and a second switch which when actuated acts upon said air valve to cause said machine to be reset by returning said crossbar to its initial position.

7. Control apparatus as defined in claim 6, wherein said plurality of switches includes a third switch which is effective upon momentary actuation to de-energize said first solenoid controlling said oil valve, thereby to close said oil valve and precompress the oil.

8. Control apparatus for providing control over a tensile tester, said tensile tester including an oil valve and an air valve utilized for performing tensile tests on materials and for insuring safety to a person standing near said tester comprising, control means having a plurality of branch circuits, and further, having a mat operated switch and a plurality of push button switches in respectively different branch circuits to effect the actuation of associated switch contacts in other branch circuits;

said control means including at least five control relays, the first of said control relays being connected in the branch circuit with said mat operated switch, the second, third, fourth and fifth of said control relays being connected in other branch circuits having switch contacts therein, controlled by said push button switches;

a first solenoid connected in a branch circuit with the normally closed contacts of said fifth control relay, said first solenoid continuously receiving power as long as said fifth control relay is de-energized, and insuring that said oil valve will be in a normally closed, fail-safe condition in the event that the power supply is interrupted;

a second solenoid connected in shunt with said fourth control relay for controlling the operation of said air valve.

9. Control apparatus as defined in claim 8 wherein said control means includes a Fire switch and said machine includes a crosshead, and wherein said plurality of switches includes a first switch which when actuated together with said Fire switch acts upon said air valve and said oil valve to cause a downward stroke of said crosshead and a second switch which when actuated acts upon said air valve to cause said machine to be reset by returning said crosshead to its initial position.

10. Control apparatus as defined in claim 9, wherein said plurality of switches includes a third switch which is effective, upon momentary actuation thereof, to de-energize said first solenoid controlling said oil valve, thereby to close said oil valve and pre-compress the oil.

11. Control apparatus as defined in claim 8, wherein said mat operated switch is effective when actuated to cause energization of said first control relay, said first control relay having normally closed contacts in a plurality of branch circuits which contacts are effective, upon energization of said first control relay, to prevent application of power directly to said second and third control relays, and also to prevent a "back circuit" to said third control relay.

12. Control apparatus as defined in claim 10, wherein said normally closed contacts are effective to prevent application of power to said fourth and fifth control relays unless said third switch has been momentarily actuated.

13. In a control apparatus for providing control over an oil valve, and an air valve forming part of a tensile tester, and for insuring safety to a person standing near said tester; the improvement which comprises, control means including a mat operated switch, and first, second and third switches connected in respective branch circuits;

said control means further including first, second, third, fourth and fifth control relays in respectively different branch circuits;

said mat operated switch being operable to prevent application of power to pre-determined ones of said control relays, said first switch being effective to energize said fourth control relay and said air valve solenoid, thereby opening said air valve;

said second switch being effective to de-energize said fourth control relay and said air valve solenoid, thereby closing said air valve;

said third switch being initially effective when actuated to energize said fifth control relay thereby de-energizing said oil valve solenoid closing said oil valve, said third switch also being effective thereafter to energize said fourth control relay.

References Cited

UNITED STATES PATENTS

| | | | |
|---|---|---|---|
| 2,055,225 | 9/1936 | Tooker | 192—129 |
| 2,644,546 | 7/1953 | Doolan | 340—272 X |
| 2,840,135 | 6/1958 | Fowler. | |
| 3,147,000 | 9/1964 | Pinckaers | 340—223 |

ROBERT K. SCHAEFER, Primary Examiner

T. B. JOIKE, Assistant Examiner

U.S. Cl. X.R.

307—119; 340—272; 192—129